US011111936B2

(12) United States Patent
Alger et al.

(10) Patent No.: US 11,111,936 B2
(45) Date of Patent: Sep. 7, 2021

(54) PISTON ASSEMBLY HAVING REDUCED EXTEND FORCE AND REDUCED DISPLACEMENT VOLUME

(71) Applicant: Roller Bearing Company of America, Inc., Oxford, CT (US)

(72) Inventors: Mark Alger, Oro Valley, AZ (US); Brandon Brown, Tucson, AZ (US); Jeremy Ulliman, Tucson, AZ (US)

(73) Assignee: Roller Bearing Company of America, Inc., Oxford, CT (US)

(*) Notice: Subject to any disclaimer, the term of this patent is extended or adjusted under 35 U.S.C. 154(b) by 0 days.

(21) Appl. No.: 16/998,643

(22) Filed: Aug. 20, 2020

(65) Prior Publication Data

US 2021/0054931 A1 Feb. 25, 2021

Related U.S. Application Data

(60) Provisional application No. 62/889,180, filed on Aug. 20, 2019.

(51) Int. Cl.
| F15B 15/17 | (2006.01) |
| F16J 1/00 | (2006.01) |
| F16J 1/04 | (2006.01) |
| F15B 15/22 | (2006.01) |

(52) U.S. Cl.
CPC .............. *F15B 15/17* (2013.01); *F16J 1/008* (2013.01); *F16J 1/04* (2013.01); *F15B 15/221* (2013.01)

(58) Field of Classification Search
CPC ......... F15B 15/17; F15B 15/221; F16J 1/005; F16J 1/008

USPC ................................ 92/6 R, 181 R, 181 P
See application file for complete search history.

(56) References Cited

U.S. PATENT DOCUMENTS

| 3,224,378 A * | 12/1965 | Graham ................ F16J 15/164 |
| | | 92/182 |
| 3,677,141 A | 7/1972 | Lagerqvist et al. |
| 3,815,480 A | 6/1974 | Spyra |
| 3,869,861 A | 3/1975 | Case |
| 4,072,013 A | 2/1978 | Barbareschi |
| 5,228,507 A | 7/1993 | Obrejanu et al. |
| 5,237,916 A * | 8/1993 | Malashenko ......... F15B 15/149 |
| | | 92/181 P |
| 5,349,894 A | 9/1994 | Greer |
| 5,802,953 A * | 9/1998 | Nakamura .......... F15B 15/1409 |
| | | 92/181 P |

(Continued)

FOREIGN PATENT DOCUMENTS

| DE | 10319054 A1 | 11/2004 |
| GB | 2569189 A | 6/2019 |

(Continued)

*Primary Examiner* — Michael Leslie
(74) *Attorney, Agent, or Firm* — Murtha Cullina LLP

(57) ABSTRACT

A piston assembly including a shaft having a piston arrangement. The piston arrangement has a retract-area on one side and a extend-area on the opposite side. The retract-area is larger than the extend-area so that when fluid exerts a force on the retract-area the piston arrangement generates and applies a retract force to the shaft. Upon release of the fluid pressure to the retract-area and application of the fluid pressure to the extend-area the piston arrangement generates and applies an extend force to the shaft. The retract force is greater than or equal to the extend force.

20 Claims, 8 Drawing Sheets

(56) References Cited

U.S. PATENT DOCUMENTS

| | | | |
|---|---|---|---|
| 8,601,934 B1 | 12/2013 | Westendorf | |
| 8,950,558 B2 | 2/2015 | Turner et al. | |
| 9,010,234 B1 | 4/2015 | Foster | |
| 9,879,701 B2 | 1/2018 | Green et al. | |
| 10,634,208 B2 | 4/2020 | Komori et al. | |
| 2012/0266590 A1 | 10/2012 | Janes et al. | |
| 2019/0301497 A1 | 10/2019 | Jordan | |
| 2020/0102974 A1* | 4/2020 | Girin | F15B 15/17 |

FOREIGN PATENT DOCUMENTS

| | | |
|---|---|---|
| JP | 57179404 | 11/1982 |
| KR | 101146027 B1 | 5/2012 |
| WO | 2012164196 A3 | 12/2012 |
| WO | 2016079653 A1 | 5/2016 |
| WO | 2017018886 A1 | 2/2017 |

* cited by examiner

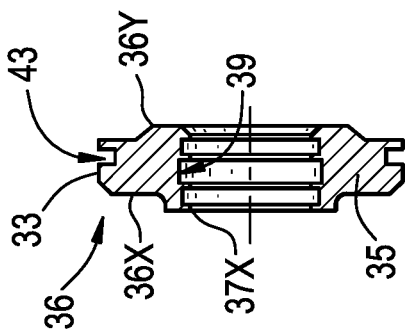
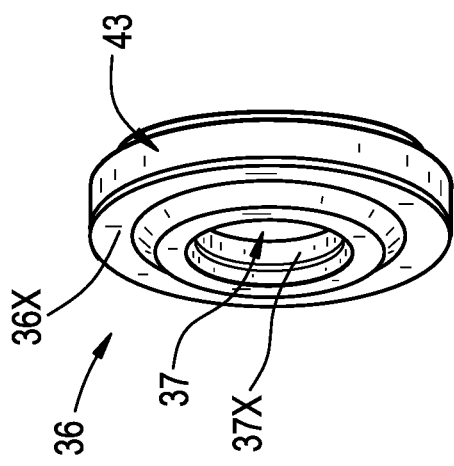
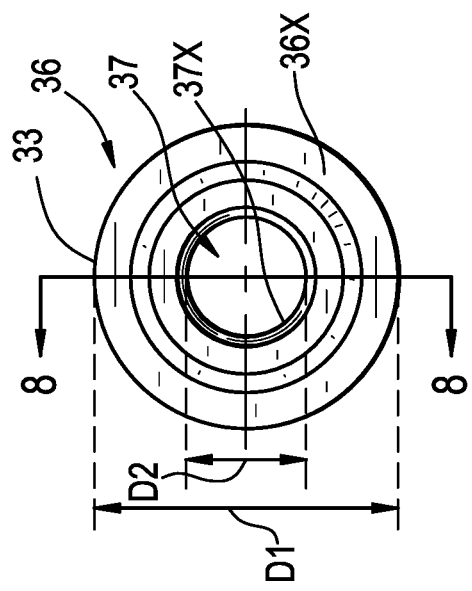
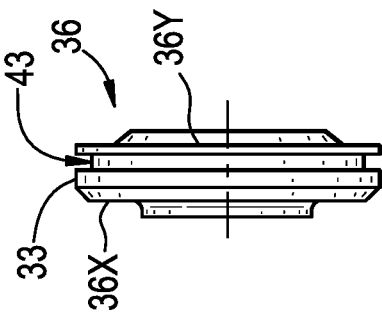

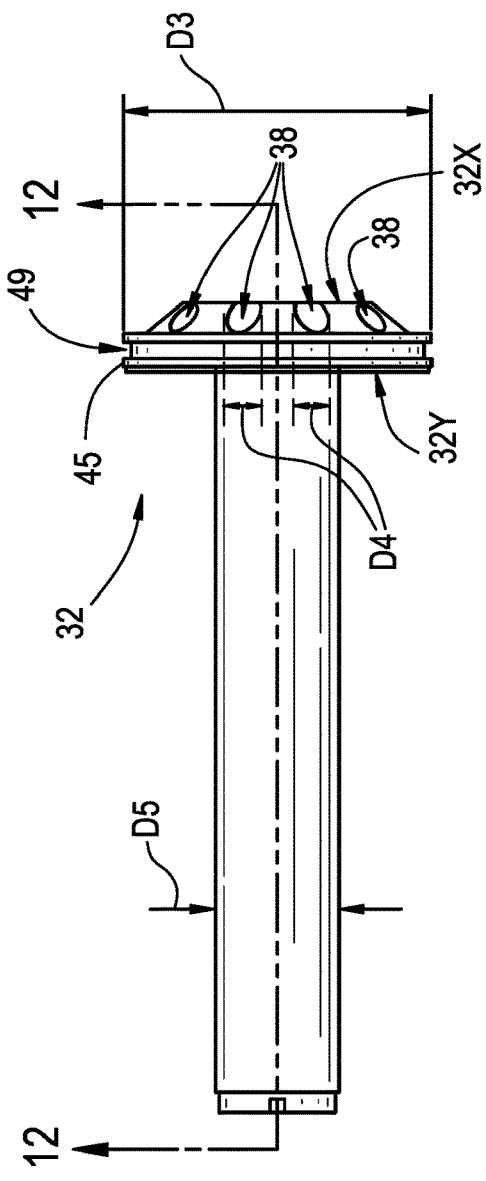
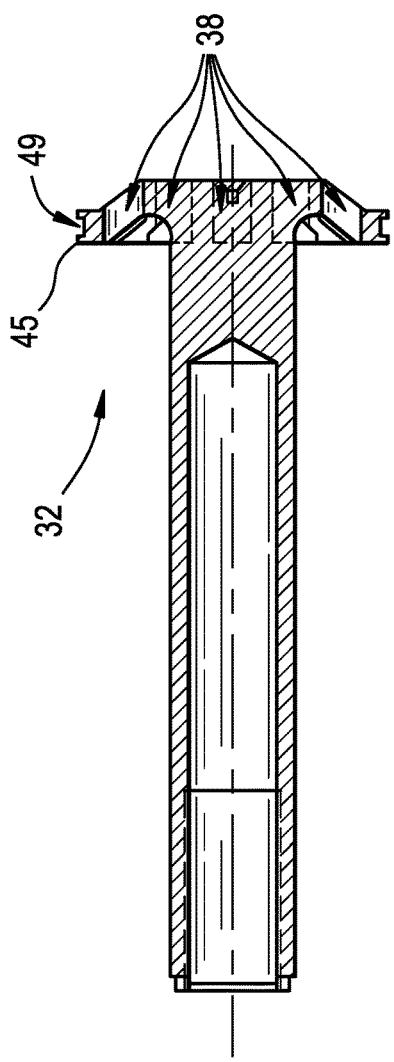
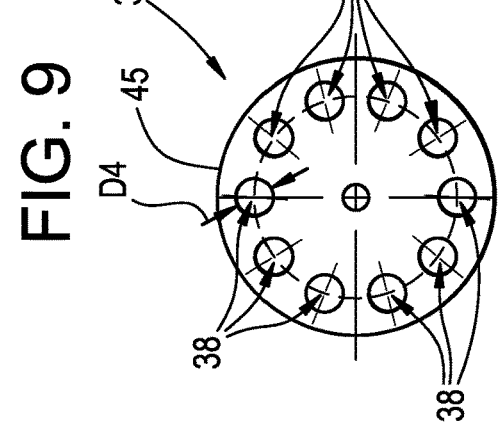
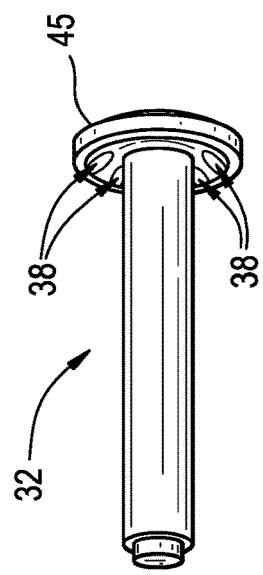

PISTON ASSEMBLY HAVING REDUCED EXTEND FORCE AND REDUCED DISPLACEMENT VOLUME

CROSS REFERENCE TO RELATED APPLICATIONS

This application claims the benefit of U.S. Provisional Patent Application Ser. No. 62/889,180 filed on Aug. 20, 2019, which is incorporated herein by reference in its entirety.

TECHNICAL FIELD

The present invention is directed to a piston assembly having an extend force that is less than a retract force and that is configured to conserve porting of actuation fluid to and from the piston assembly during operation and during idling.

BACKGROUND

As disclosed herein, prior art piston assemblies are limited in application because the movement of the piston within the interior area of the housing has a linear relationship with respect to the volume of fluid moving into and out of the interior area of the housing.

FIG. 13 depicts a typical prior art piston assembly 1 with a piston head 5 that responds linearly to the volume of actuation fluid supplied by a hydraulic pumping system ported into and out of the two ports 3, 4. During operation, the fluid pressure within an interior area 6 of the housing 7 is up to 3000 PSI on either side of the piston head 5, causing the shaft 2 to either retract into the interior area 6 or extend out of the interior area 6 depending on the pressure differential across the piston head 5. During idling of the hydraulic pumping system, the actuation fluid in the interior area 6 is at pressures as low as 100 PSI. The shaft 2 is subjected to rapidly changing large forces in opposing directions, resulting in rapid alternating extending and retracting movement of the shaft 2. This rapid movement or dithering of the shaft 2 and the piston head 5 within the interior area 6 causes a volume of actuation fluid to rapidly flow into and out of ports 3, 4. There is an especially large volume of fluid moving into and out of the interior area 6 through ports 3, 4, in the prior art piston assembly 1, because the volume of fluid responds linearly to movement of the shaft 2 in both directions (during extension of the shaft 2 from the interior area 6 and during retraction of the shaft 2 into the interior area 6). This large change in fluid volume to either side of the piston head 5 subjects the piston head 5 to significant risk of damage.

Based on the foregoing, there is a need in the art for an adjustable piston assembly that minimizes risk of damage to the piston head and that allows the piston assembly to accommodate dithering of the shaft and piston head.

SUMMARY

The present invention includes a piston assembly including a shaft and a piston arrangement on the shaft. The piston arrangement has a retract-area moved by a fluid to retract the shaft and a extend-area moved by a fluid to extend the shaft. The retract-area is greater than the extend-area, so that when fluid pressure is applied to the retract-area the piston arrangement generates and applies a retract force to the shaft and when the fluid pressure is released from the retract-area and applied to the extend-area the piston arrangement generates and applies an extend force to the shaft. The retract force is greater than or equal to the extend force.

In some embodiments, the piston arrangement has a piston head secured to the shaft. At least one aperture extends through the piston head. A retract head surrounds and slides along the shaft. The piston arrangement causes extension of the shaft from a retracted position to an extended position and causes retraction of the shaft from the extended position to the retracted position. A variable volume reservoir forms between the piston head and the retract head.

In some embodiments, there are multiple holes extending through the piston head.

In some embodiments, the hole provides a flow path for flow of actuation fluid between opposing sides of the piston head.

In some embodiments, the cross sectional area of the hole(s) causes the retract-area to be larger than the extend-area.

In some embodiments, the retract head is an annular disc with an inside surface defining a bore extending through the annular disc.

In some embodiments, the inside surface of the annular disc has a first groove with a first seal. The first seal slidingly and sealingly engages the shaft.

In some embodiments, the retract head is a fluid barrier to the actuation fluid across the retract head.

In some embodiments, the retract head has a first circumferential surface with a second groove and a second seal.

In some embodiments, the piston head has a second circumferential surface with a third groove and a third seal. The second seal and the third seal are configured to slidingly and sealingly engage an interior surface of a housing configured to retain the piston assembly.

In some embodiments, the variable volume reservoir increases or decreases in volume during the extension of the shaft to conserve actuation fluid ported to and from the piston assembly. Alternatively, the increase or decrease in volume during retraction of the shaft conserves actuation fluid ported to and from the piston assembly.

In some embodiments, the variable volume reservoir has a constant volume during either the extension of the shaft or the retraction of the shaft to conserve actuation fluid ported to and from the piston assembly.

In some embodiments, the piston assembly includes a shaft and a piston arrangement positioned around the shaft. The piston arrangement causes extension of the shaft from a retracted position to an extended position and causes retraction of the shaft from the extended position to the retracted position. The piston arrangement also has a variable volume reservoir that can increase or decrease in volume during the extension or retraction of the shaft to conserve actuation fluid ported to and from the piston assembly. In some embodiments, the variable volume reservoir has a constant volume during the extension or the retraction of the shaft to conserve actuation fluid ported to and from the piston assembly.

In some embodiments, the piston arrangement has a retract-area for retracting the shaft and a extend-area for extending the shaft. The retract-area is larger than the extend-area. Upon application of a fluid pressure to the retract-area the piston arrangement generates and applies a retract force to the shaft. Upon release of the fluid pressure to the retract-area and application of the fluid pressure to the extend-area the piston arrangement generates and applies an extend force to the shaft. As a result, the retract force is greater than or equal to the extend force.

In some embodiments, the piston arrangement includes a piston head secured to the shaft and the piston head has at least one aperture. The piston arrangement includes a retract head that slides along the shaft. The piston arrangement causes extension of the shaft from a retracted position to an extended position and causes retraction of the shaft from the extended position to the retracted position.

In some embodiments, the piston head includes a number of holes.

In some embodiments the aperture is a flow path for the flow of actuation fluid between opposing sides of the piston head.

In some embodiments, the piston arrangement includes a piston head secured to the shaft and the piston head has at least one aperture extending therethrough. The cross sectional area of the aperture(s) causes the retract-area to be more than the extend-area.

In some embodiments, the retract head is an annular disc having an inside surface defining a bore extending through the annular disc.

In some embodiments, the inside surface of the annular disc includes a first groove with a first seal. The first seal slidingly and sealingly engages the shaft.

In some embodiments, the retract head is a barrier to the flow of actuation fluid across the retract head.

In some embodiments, the retract head has a first circumferential surface with a second groove formed therein and a second seal in the second groove. The piston head has a second circumferential surface with a third groove formed therein and a third seal in the third groove. The second seal and the third seal are configured to slidingly and sealingly engage an interior surface of a housing configured to retain the piston assembly.

The present invention includes a piston assembly that includes a shaft and a piston arrangement positioned on the shaft. The piston arrangement is configured to cause extension of the shaft from a retracted position to an extended position and to cause retraction of the shaft from the extended position to the retracted position. The piston arrangement includes a variable volume reservoir, the variable volume reservoir being at least one of; (a) at least one of increasing and decreasing, during at least a portion of the extension of the shaft, to conserve actuation fluid ported to and from the piston assembly; (b) at least one of increasing and decreasing, during at least a portion of the retraction of the shaft, to conserve actuation fluid ported to and from the piston assembly; (c) constant during at least a portion of the extension of the shaft to conserve actuation fluid ported to and from the piston assembly; and (d) constant during at least a portion of the retraction of the shaft, to conserve actuation fluid ported to and from the piston assembly.

In some embodiments, the piston arrangement has a retract-area configured for retracting the shaft and a extend-area configured for extending the shaft. The retract-area is greater than the extend-area so that upon application of a fluid pressure to the retract-area the piston arrangement generates and applies a retract force to the shaft and upon release of the fluid pressure to the retract-area and application of the fluid pressure to the extend-area the piston arrangement generates and applies an extend force to the shaft. The retract force is greater than or equal to the extend force.

In some embodiments, the piston arrangement includes a piston head secured to the shaft. The piston head has one or more apertures extending therethrough. The piston arrangement includes a retract head moveably mounted on the shaft. The piston arrangement is configured to cause extension of the shaft from a retracted position to an extended position and to cause retraction of the shaft from the extended position to the retracted position.

In some embodiments, the apertures are in the form of a plurality of holes extending through the piston head each of which are flow paths for flow of actuation fluid between opposing sides of the piston head.

In some embodiments, the piston arrangement includes a piston head secured to the shaft.

The present invention includes a piston assembly that includes a shaft and a piston arrangement positioned on the shaft. The piston arrangement is configured to cause extension of the shaft from a retracted position to an extended position and to cause retraction of the shaft from the extended position to the retracted position. The piston arrangement includes a variable volume reservoir that is: (a) at least one of increasing and decreasing, during at least a portion of the extension of the shaft, to conserve actuation fluid ported to and from the piston assembly; (b) at least one of increasing and decreasing, during at least a portion of the retraction of the shaft, to conserve actuation fluid ported to and from the piston assembly; (c) constant during at least a portion of the extension of the shaft to conserve actuation fluid ported to and from the piston assembly; and (d) constant during at least a portion of the retraction of the shaft, to conserve actuation fluid ported to and from the piston assembly.

The present invention includes a piston assembly that is disposed in an interior area of a housing (e.g., a cylinder). The piston assembly includes a shaft and a piston arrangement positioned on the shaft. The piston arrangement includes a retract head that is slidably mounted on the shaft and configured for retracting the shaft. The piston arrangement includes a piston head fixedly secured to the shaft and configured for extending the shaft, the retract head having a having retract-area and the piston head having a having a extend-area. The retract head and the piston head are disposed entirely in the interior area of the housing. The retract-area has a first magnitude and the extend-area has a second magnitude. The first magnitude is greater than the second magnitude so that upon application of a fluid pressure to the retract-area the piston arrangement generates and applies a retract force to the shaft and upon release of the fluid pressure to the retract-area and application of the fluid pressure to the extend-area the piston arrangement generates and applies an extend force to the shaft, the fluid pressure having a predetermined magnitude; and the retract force is greater than or equal to the extend force. The piston arrangement is configured to cause extension of the shaft from a retracted position to an extended position and to cause retraction of the shaft from the extended position to the retracted position. The piston assembly includes a variable volume reservoir that is formed between the piston head and the retract head. The variable volume reservoir has a volume that is configured to change during some axial movement of the shaft and to remain constant during other axial movement of the shaft.

BRIEF DESCRIPTION OF THE DRAWINGS

FIG. 5 is a perspective view of the retract head of the piston arrangement of FIG. 1;

FIG. 6 is a side view of the retract head of the piston arrangement of FIG. 1;

FIG. 7 is a front view of the retract head of the piston arrangement of FIG. 1;

FIG. 8 is a cross sectional view of the retract head of FIG. 6 taken across section A-A;

FIG. 9 is a front view of the piston head of FIG. 1;

FIG. 10 is a side view of the piston head and shaft of FIG. 1;

FIG. 11 is a perspective view of the piston head and shaft of FIG. 1;

FIG. 12 is a cross sectional view of the piston head and shaft of FIG. 9 taken across section A-A.

DETAILED DESCRIPTION

Figure 1:
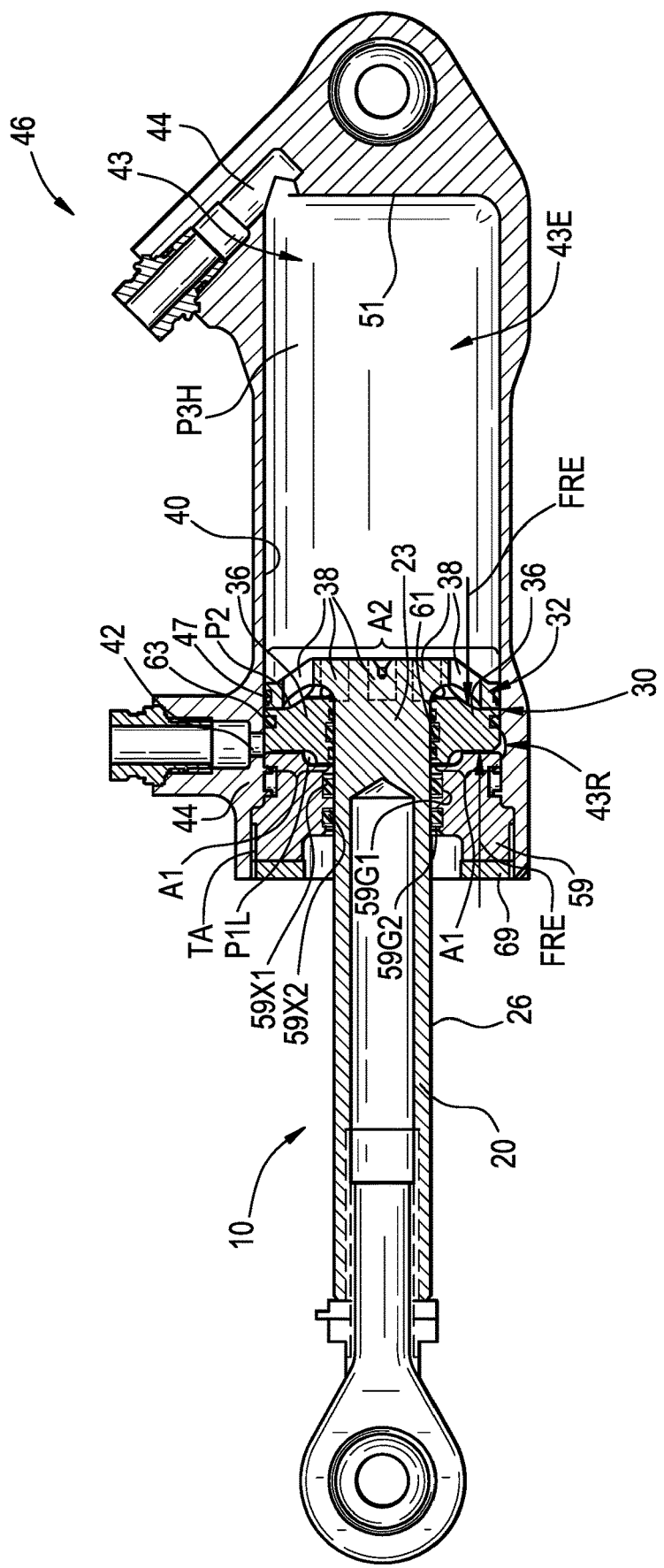
FIG. 1 is a cross sectional view of the piston arrangement of the present invention shown in a housing with the piston arrangement in a fully extended state.

As shown in FIGS. 1-4, a piston assembly is generally designated by reference numeral 10. The piston assembly 10 includes a shaft 20. The shaft 20 is an elongated cylindrical member that has an outer surface 26 (e.g., cylindrical surface that has that a uniform outside diameter). The piston assembly 10 FIGS. 5-8) includes a retract head 36 (e.g., a floating head) that is mounted on the shaft 20 and slidingly engages the shaft 20.

Referring to FIGS. 1-4, the piston assembly 10 includes a piston head 32 formed on the shaft 20, for example, located proximate a second end 23 of the shaft 20. The shaft 20 and piston head 32 are united as a single element, but other fixed attachment means do not depart from the scope of the present disclosure. The piston head 32 has a first outer circumferential surface 45 that slides along the inner surface 40 of interior area 43.

The piston head 32 and the retract head 36 are collectively referred to herein as the piston arrangement 30. The piston arrangement 30 and the shaft 20 are collectively referred to herein as the piston assembly 10.

The piston arrangement 30 is retained within a housing 46 (e.g., a cylinder arrangement). The housing 46 has an inner surface 40 that defines an interior area 43 (e.g., a cylindrical bore). The inner surface 40 of the interior area 43 of the housing 46 is defined by a retract portion 43R and an extend portion 43E.

As shown in FIGS. 1-4, a retract port 42 extends through the housing 46 and defines a fluid flow path into the interior area 43. The retract port 42 is located proximate an open end 41 of the housing 46. The retract portion 43R receives and discharges actuation fluid from a retract port 42.

As shown in FIGS. 1-4, an extend port 44 extends through the housing 46 and defines a fluid flow path into the interior area 43. The extend port 44 is located proximate a closed end 51 of the housing 46. The extend portion 43E receives and discharges actuation fluid from an extend port 44.

The housing 46 includes a guide sleeve 59 that is removably disposed in the interior areas 43 between the open end 41 and the retract port 42. The guide sleeve 59 is retained in the housing 46 via a threaded engagement area TA. A locking nut 69 further retains the guide sleeve 59 in the housing 46 via the threaded engagement area TA. The shaft 20 extends through a sleeve bore 59B. Grooves 59G1 and 59G2 are formed in the sleeve bore 59B. An annular shaft seal 59X1 is disposed in the groove 59G1 and another annular shaft seal 59X2 is disposed in the groove 59G2. The shaft 20 slidingly engages the shaft seals 59X1 and 59X2. The guide sleeve 59, the shaft seals 59X1 and 59X2 and the shaft 20 cooperate to seal the open end 41 of the housing 46.

As shown in FIGS. 1-4, the piston head 32 and the retract head 36 (i.e., the piston arrangement 30) are disposed entirely in the interior area 43 of the housing 46. Thus, the housing 46 and guide sleeve 59 completely retain the piston head 32 and the retract head 36 in the interior area 43 between the first end 41 and the second end 51. The piston head 32 and the retract head 36 are located substantially between the retract port 42 and the extend port 44.

Referring to FIGS. 5-8, the retract head 36 is an annular disc (i.e., a flat round member) that has an inside surface 37X that defines a retract bore 37 which extends through the retract head 36. The retract head 36 has an outside diameter D1, and the retract bore 37 has an inside diameter D2, as shown in FIG. 7. The inside surface 37X has first groove 39 with a first seal 61 disposed therein (depicted in FIGS. 1-4). The first seal 61 slidingly and sealingly engages the outer surface 26 of the shaft 20. An outer circumferential surface 33 of the retract head 36 has a second groove 43 formed therein and the second groove 43 retains a second seal 63 (also depicted in FIGS. 1-4). The retract head 36 provides a barrier to the flow of actuation fluid between the extend portion 43E and the retract portion 43R, for example at an interface between the second seal 63 and the surrounding inner surface 40 of the interior area 43. A retract-head-area A1 is defined as the surface area of one axial face 36X of the retract head 36 in direct fluid communication with actuation fluid ported through the retract port 42 into the interior area 43. The retract-head-area A1 is also equal to the area A1' on the opposing axial face 36Y of the retract head 36.

Referring to FIG. 7, the retract-area A1 can be expressed by the equation:

$$A1 = A3 - A4 \quad (1)$$

A3 is defined as the area of a circle that has the same outside diameter D1 as the retract head 36. A4 is defined as the area of a circle with that has the same diameter as the inside diameter D2 of the retract bore 37. The retract-area A1 can be increased slightly by taking into consideration the radial widths of the seals 61 and 63.

As shown in FIG. 10, the piston head 32 has an outside diameter D3 and the shaft has an outside diameter D5. As shown in FIG. 9 each of the apertures 38 have an inside diameter D4.

An extend-area A2 is defined as the surface area of a first axial face 32X of the piston head 32 that faces away from the shaft 20. Referring to FIGS. 9 and 10, the extend-area A2 is defined as the area of a circle having a diameter that is equal to the outside diameter D3 of the first axial face 32X of the piston head 32, minus a total of the cross sectional areas of the apertures 38 (each aperture being defined by a circle with a diameter D4). Referring to FIGS. 9 and 10, the extend-area A2 can be expressed by the equation:

$$A2 = \pi \left(\frac{D3}{2}\right)^2 - n \cdot \left[\pi \left(\frac{D4}{2}\right)^2\right] \quad (2)$$

Where n is the number of apertures, D3 is the diameter of the first axial face 32X and D4 is the diameter of each of the apertures 38.

As shown in FIG. 10, the piston head 32 has second axial face 32Y that is opposite the first axial face 32X. The second axial face 32Y has an effective axial surface area A5 that is equal to the area A2 minus the area of a circle having the same diameter as the outside diameter D5 of the shaft.

Referring to FIGS. 9-12, the piston head 32 has a second circumferential surface 45 with a third groove 49. The third groove 49 retains a third seal 47 (depicted in FIGS. 1-4). The second seal 63 and the third seal 47 slidingly and sealingly engage the inner surface 40 of interior area 43 (also depicted in FIGS. 1-4).

Figure 2A:
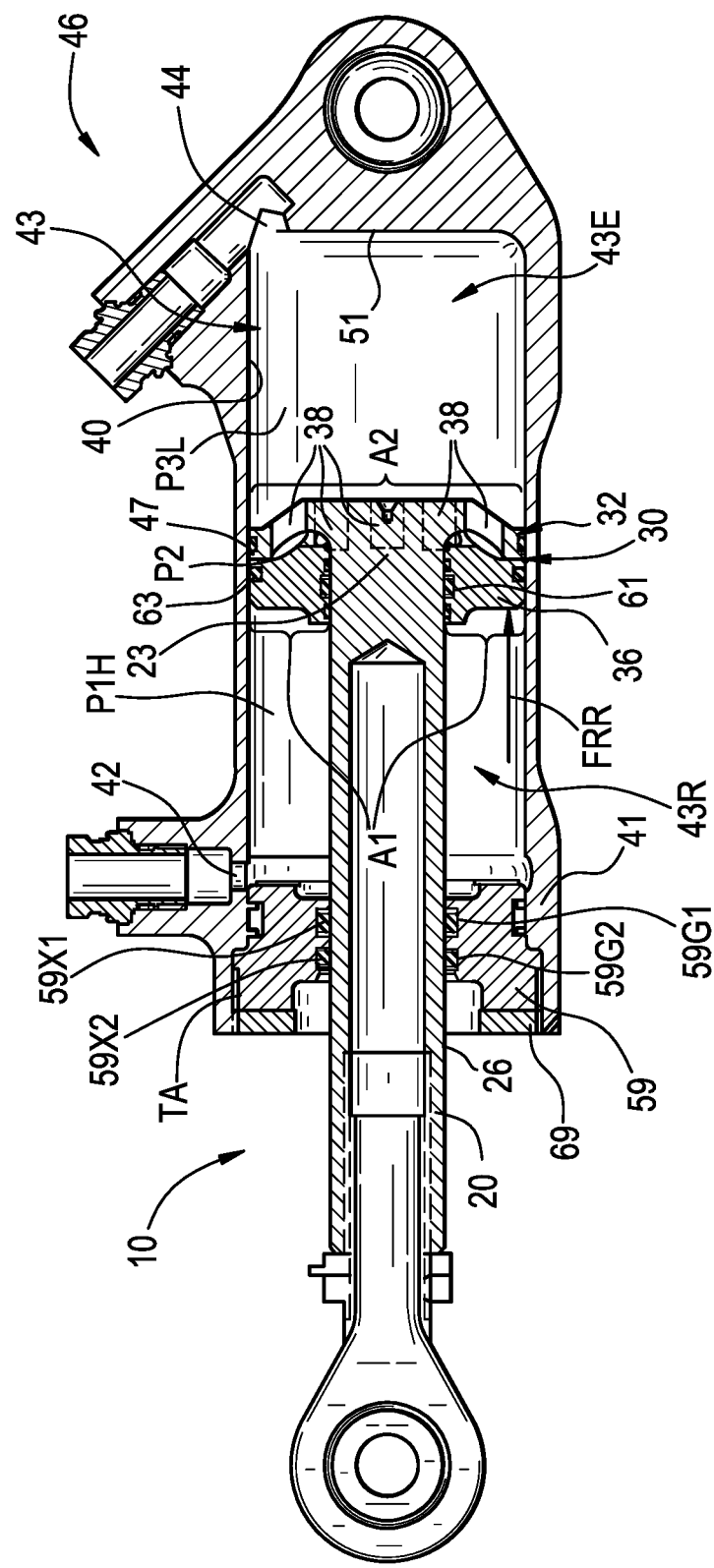
FIG. 2A is a cross sectional view of the piston arrangement of the present invention shown in a housing with the piston arrangement in an intermediate state during movement to a retracted state.
Figure 4:
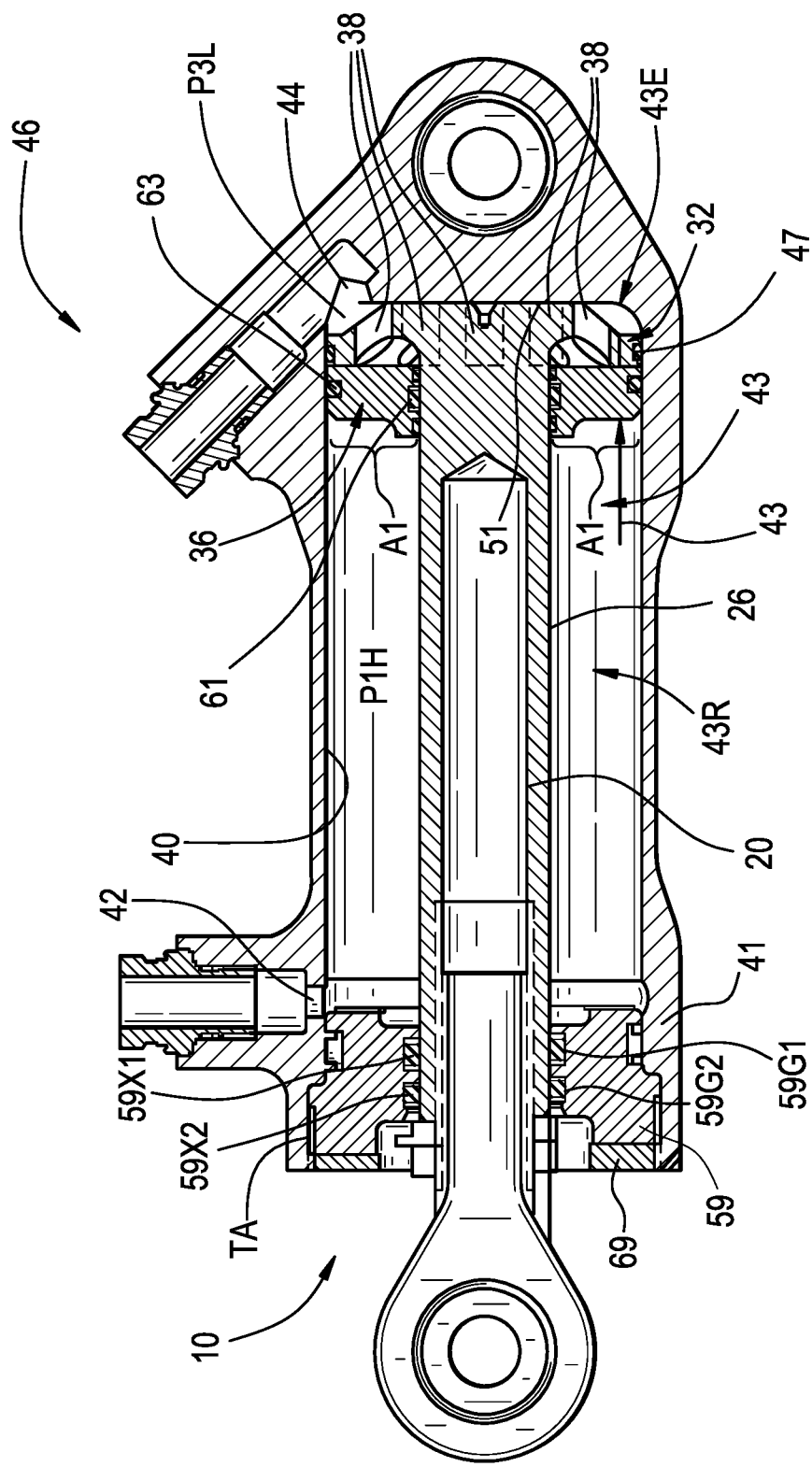
FIG. 4 is a cross sectional view of the piston arrangement of the present invention shown in a housing with the piston arrangement in the fully retracted state.

FIG. 2A depicts the piston arrangement 30 in an intermediate state during a retract stroke movement towards a fully retracted state (FIG. 4) in which the retract head 36, the piston head 32 and the shaft 20 are retracted toward the closed end 51 of the housing 46. As shown in FIG. 2A, during the retract stroke, the actuation fluid that passes through the retract port 42 into the retract portion 43R of the interior area 43 of the housing 46 is at a high pressure P1H. During the retract stroke, the actuation fluid ported through the retract port 42 that is at the pressure P1H and generates a retract force FRR on the retract-area A1 of the retract head 36, which causes the retract head 36 to slide on the shaft 20 towards the piston head 32 until the retract head 36 abuts the piston head. The retract head 36 imparts a force FRR' onto the piston head 32 and the shaft 20. During the retract stroke, the actuation fluid in the extend portion 43E of interior area 43 is reduced to a low pressure P3L (e.g., to an idling pressure or atmospheric pressure) and allowed to exit via the extend port 44. During the retract stroke, the retract force FRR and the force FRR' result in retraction of retract head 36, the shaft 20 and piston head 32 simultaneously together towards the closed end 51 and eventually into the fully retracted position, as depicted in FIG. 4. During the retract stroke when the retract head 36 abuts the piston head 32, the pressure P2 between the react head 36 and the piston head 32 is equalized to the pressure P3L via the apertures 38.

Figure 2B:
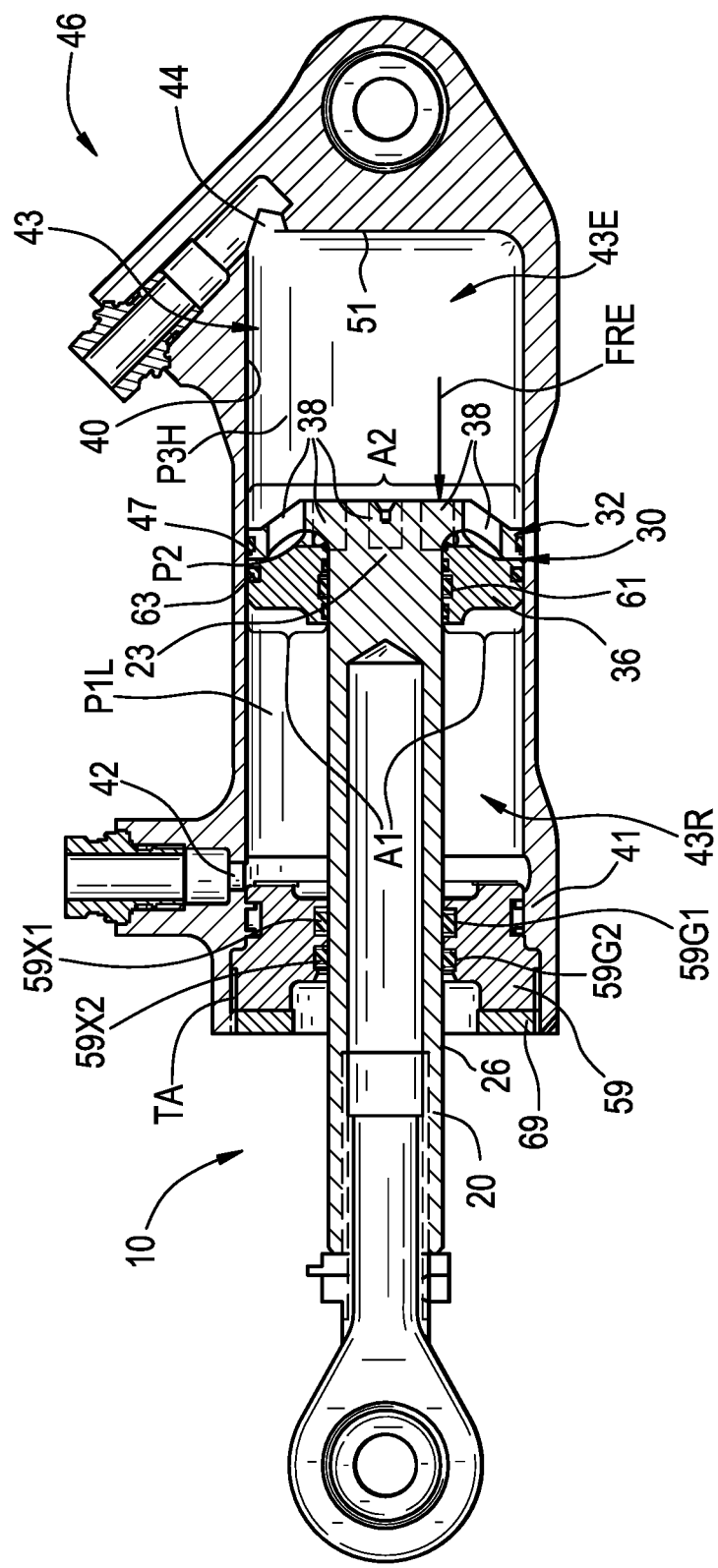
FIG. 2B is a cross sectional view of the piston arrangement of the present invention shown in a housing with the piston arrangement in an intermediate state during initial movement to an extended state.

FIG. 2B depicts the piston arrangement 30 in an intermediate state during an extend stroke movement towards a fully extended state (FIG. 1) in which the retract head 36, the piston head 32 and the shaft 20 are fully extended toward the guide sleeve 59. As shown in FIG. 2B, during the extend stroke, the actuation fluid that passes through the extend port 44 into the extend portion 43E of the interior area 43 of the housing 46 is at a high pressure P3H. The actuation fluid ported through the extend port 44 that is at the pressure P3H generates an extend force FRE on the extend-area A2 of the piston head 32 and the shaft 20. During the extend stroke, the actuation fluid in the retract portion 43R of interior area 43 is reduced to a pressure P3L (e.g., to an idling pressure or atmospheric pressure) and allowed to exit via the retract port 42. During the extend stroke, the extend force FRE result in extension of piston head, 32, retract head 36 and the shaft 20 simultaneously together towards the guide sleeve 59 and eventually into the fully extended position, as depicted in FIG. 1. During the extend stroke, some of the actuation fluid in the extend portion 43E of the interior area 43 flows through the apertures 38 in the piston head 32 which causes the retract head 36 to slide on the shaft 20 in a direction away from the piston head 32 and toward the guide sleeve 59.

The pressure differential across the piston head 32 or across the retract head 36 dictates the location of the shaft 20 and piston head 23 between the fully extended state (FIG. 1) and fully retracted state (FIG. 4). Since the retract-head-area A1 is greater than the extend-area A2, the retract force FRR (i.e. FRR=(P1H×A1)−(P3H×A2)) is greater than the extend force (i.e., FRE=(P3H×A2)−(P2×A5)), when P1H=P3H.

The pressures in the interior area 43 alternate between an operational state and an idling state. In the operational state, the pressure P1H in the retract portion 43R and/or the pressure P3H in the extend portion 43E of interior area 43 is up to 3000 PSI. In the idling state, the pressure P1L in the retract portion 43R and/or pressure P3L in the extend portion 43E of interior area 43 is as low as 100 PSI. The pressure in the retract portion 43R and extend portion 43E change between the operational state and the idling state independently of one another to allow the piston arrangement 30 to move between being fully extended from and the fully retracted within the interior area 43. The pressures P1H, P1L, P2, P3H and P3L may be in the range zero to 3000 pounds per square inch, or any other magnitude.

Figure 3:
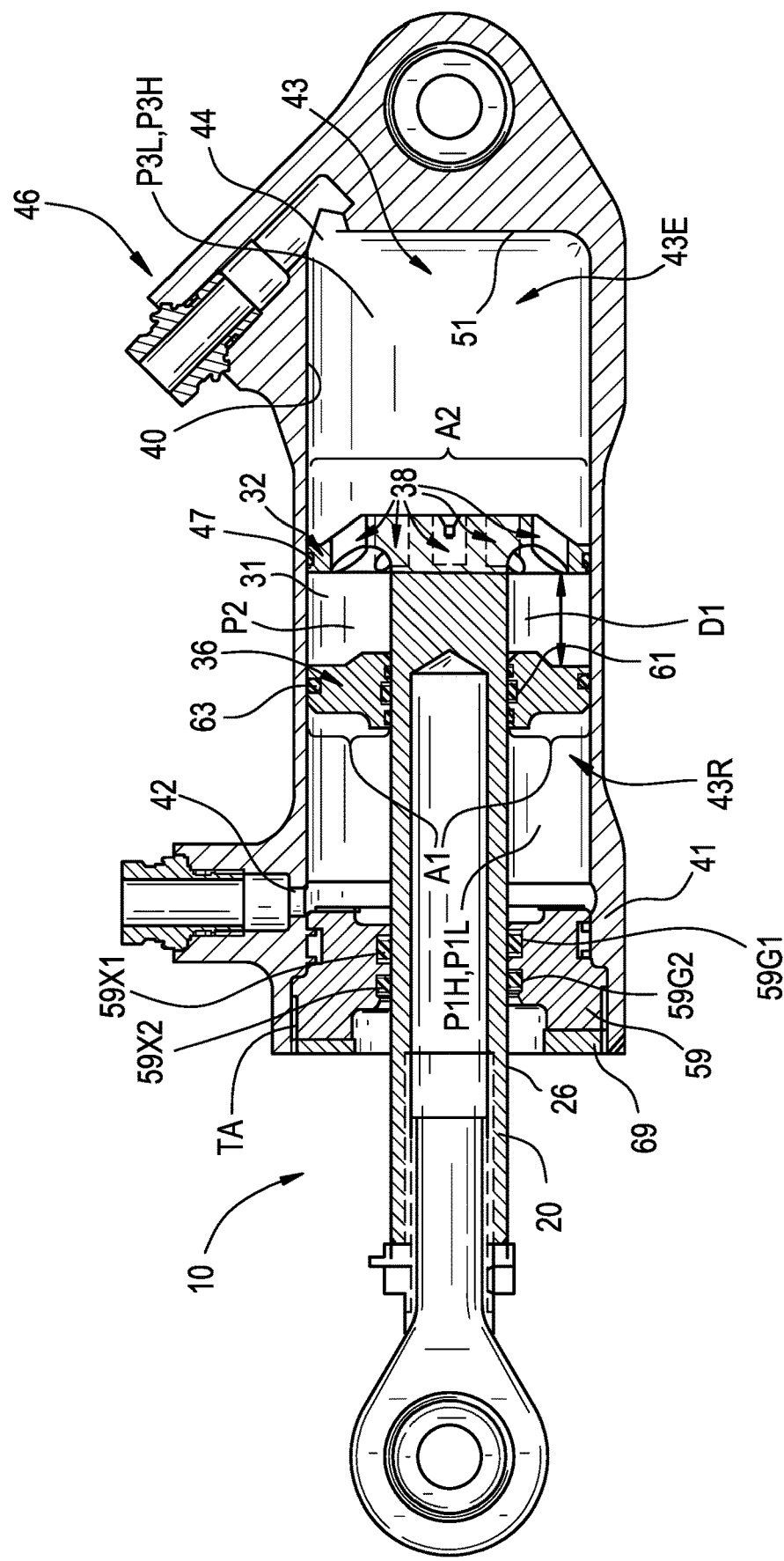
FIG. 3 is a cross sectional view of the piston arrangement of the present invention shown in a housing with the piston arrangement in an intermediate state during dithering movement.

Referring to FIG. 3, the retract head 36 is separately axially moveable relative to the shaft 20 and the piston head 32. The apertures 38 in the piston head 32 allow actuation fluid to flow through the piston head 32 and form a variable volume reservoir 31 between the piston head 32 and the retract head 36. The variable volume reservoir 31 is defined axially between the retract head 36 and the piston head 32 and is defined radially between the outer surface 26 of the shaft 20 and the inner surface 40 of interior area 43. The volume of the variable volume reservoir 31 changes based on the second pressure P2 between the retract head 36 and the piston head 32. Actuation fluid passes through the apertures 38 in the piston head 32 and the second pressure P2 responds to the operational and idling pressures P1H, P1L, P3H and P3L. The variable volume reservoir 31 helps conserve the amount of actuation fluid ported to and from the piston assembly 10 by accumulating a portion of the volume of actuation fluid without moving the piston head 32 in the interior area 43. Depending on the application, the variable volume reservoir 31 increases or decreases in volume to conserve the amount of actuation fluid ported to and/or from the piston assembly 10. As discussed above, the variable volume reservoir 31 accommodates changes in the volume of the actuation fluid without moving the piston head 32. In some embodiments, the variable volume reservoir 31 remains relatively constant in volume. The variable volume reservoir also accommodates dithering of the piston assembly 10 while minimizing the flow of fluid through the extend port 44 and/or the retract port 42.

Referring to FIG. 1, in the fully extended state, the pressure P3H in the extend portion 43E of the interior area 43 is greater than the pressure P1L in the retract portion 43R and the pressure P2 in the variable volume reservoir 31.

Referring to FIG. 3, the extend pressure P3H is greater than the pressure P2 in variable volume reservoir 31, which is greater than the pressure P1L. The axial distance between the retract head 36 and piston head 32 is designated as D1. Referring to FIGS. 9 and 10, ten (10) apertures 38 extend through the piston head 32. In the depicted embodiment, the apertures 38 are spaced equidistantly around the circumferential edge of the piston head 32. The apertures 38 provide a flow path for flow of actuation fluid between opposing sides of the piston head 32. The cross-sectional areas of the aperture(s) 38 in the depicted embodiments, ensures that the retract-area A1 is larger than the extend-area A2. This relationship is expressed by the equation:

$$A3-A4 \geq A2 \qquad (3)$$

Figure 13:
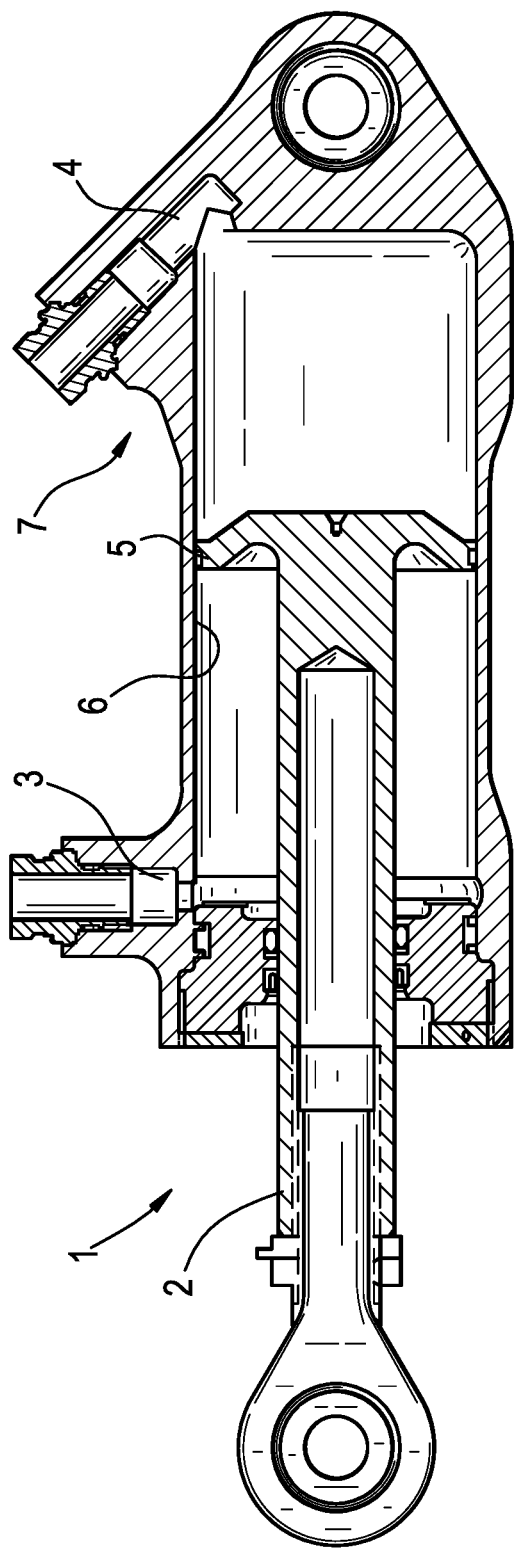
FIG. 13 is a cross sectional view of a prior art piston assembly.

The apertures 38 and the separate retract member 36 allows the extension of the shaft 20 to proceed in a non-linear manner in response to displacement of the actuation fluid. Compared to the linear movement of prior art piston assemblies 1 as depicted in FIG. 13, the piston assembly 10 disclosed herein with a non-linear response to movement of the shaft 20 minimizes the volume of actuation fluid supplied to the extend port 44 by accommodating changes in actuation fluid volume with little or no movement of the piston head 32. This is beneficial because the extend port 44, in particular, is subjected a large volume of actuation fluid flowing into and out of the extend port 44 during extension. Minimizing the volume of fluid that passes through the extend port 44 also minimizes the risk of damage to the piston head 32.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A piston assembly comprising:
   a shaft;
   a piston arrangement positioned on the shaft;
   the piston arrangement having a retract-area configured for retracting the shaft and an extend-area configured for extending the shaft;
   the retract-area being greater than the extend-area so that upon application of a fluid pressure to the retract-area the piston arrangement generates and applies a retract force to the shaft and upon release of the fluid pressure to the retract-area and application of the fluid pressure to the extend-area the piston arrangement generates and applies an extend force to the shaft, the fluid pressure having a predetermined magnitude; and
   wherein the retract force is greater than the extend force;
   the piston arrangement comprises a piston head secured to the shaft, the piston head having at least one aperture extending therethrough;
   the piston arrangement comprises a retract head moveably mounted on the shaft;
   the piston arrangement being configured to cause extension of the shaft from a retracted position to an extended position and to cause retraction of the shaft from the extended position to the retracted position; and
   a variable volume reservoir formed between the piston head and the retract head.

2. The piston assembly of claim 1, wherein the at least one aperture comprises a plurality of holes extending through the piston head.

3. The piston assembly of claim 1, wherein the at least one aperture comprises a flow path for flow of actuation fluid between opposing sides of the piston head.

4. The piston assembly of claim 1, wherein the at least one aperture has a cross sectional area of a predetermined magnitude, wherein the extend-area being calculated by subtracting the cross sectional areas of the at least one aperture from an overall axially projected area of the piston head.

5. The piston assembly of claim 1, wherein the retract head comprises an annular disc having an inside surface defining a bore extending axially through the annular disc.

6. The piston assembly of claim 5, wherein the inside surface comprises at least one first groove with a first seal disposed therein, the first seal slidingly and sealing engaging the shaft.

7. The piston assembly of claim 1, wherein the retract head is a barrier to flow of actuation fluid across the retract head.

8. The piston assembly of claim 1, wherein the retract head comprises a first circumferential surface having a second groove formed therein and a second seal disposed in the second groove; and
   the piston head comprising a second circumferential surface having a third groove formed therein and a third seal being disposed in the third groove;
   wherein the second seal and the third seal are configured to slidingly and sealingly engage an interior surface of a housing configured to retain the piston assembly.

9. The piston assembly of claim 1, wherein the variable volume reservoir is at least one of:
   (a) at least one increasing and decreasing, during at least a portion of the extension of the shaft to conserve actuation fluid ported to and from the piston assembly; and
   (b) at least one of increasing and decreasing, during at least a portion of the retraction of the shaft, to conserve actuation fluid ported to and from the piston assembly.

10. The piston assembly of claim 1, wherein the variable volume reservoir is at least one of:
    (a) constant during at least a portion of the extension of the shaft to conserve actuation fluid ported to and from the piston assembly; and
    (b) constant during at least a portion of the retraction of the shaft, to conserve actuation fluid ported to and from the piston assembly.

11. A piston assembly comprising:
    a shaft;
    a piston arrangement positioned on the shaft, the piston arrangement being configured to cause extension of the shaft from a retracted position to an extended position and to cause retraction of the shaft from the extended position to the retracted position; and
    the piston arrangement comprising a variable volume reservoir, the variable volume reservoir being at least one of:
    (a) at least one of increasing and decreasing, during at least a portion of the extension of the shaft, to conserve actuation fluid ported to and from the piston assembly;
    (b) at least one of increasing and decreasing, during at least a portion of the retraction of the shaft, to conserve actuation fluid ported to and from the piston assembly;
    (c) constant during at least a portion of the extension of the shaft to conserve actuation fluid ported to and from the piston assembly; and (d) constant during at least a portion of the retraction of the shaft, to conserve actuation fluid ported to and from the piston assembly;

the piston arrangement has a retract-area configured for retracting the shaft and an extend-area configured for extending the shaft;

the retract-area being greater than the extend-area so that upon application of a fluid pressure to the retract-area the piston arrangement generates and applies a retract force to the shaft and upon release of the fluid pressure to the retract-area and application of the fluid pressure to the extend-area the piston arrangement generates and applies an extend force to the shaft; and wherein the retract force is greater than the extend force.

12. The piston assembly of claim 11, wherein:

the piston arrangement comprises a piston head secured to the shaft, the piston head having at least one aperture extending therethrough;

the piston arrangement comprises a retract head moveably mounted on the shaft;

the piston arrangement being configured to cause extension of the shaft from a retracted position to an extended position and to cause retraction of the shaft from the extended position to the retracted position.

13. The piston assembly of claim 12, wherein the at least one aperture comprises a plurality of holes extending through the piston head.

14. The piston assembly of claim 12, wherein the at least one aperture comprises a flow path for flow of actuation fluid between opposing sides of the piston head.

15. The piston assembly of claim 11, wherein the piston arrangement comprises a piston head secured to the shaft, the piston head having at least one aperture extending therethrough; and the at least one aperture has a cross sectional area of a predetermined magnitude wherein the extend-area being calculated by subtracting the cross sectional areas of the at least one aperture from an overall axially projected area of the piston head.

16. The piston assembly of claim 12, wherein the retract head comprises an annular disc having an inside surface defining a bore extending through the annular disc.

17. The piston assembly of claim 16, wherein the inside surface comprises at least one first groove with a first seal disposed therein, the first seal slidingly and sealing engaging the shaft.

18. The piston assembly of claim 12, wherein the retract head is a barrier to flow of actuation fluid across the retract head.

19. The piston assembly of claim 12, wherein the retract head comprises a first circumferential surface having a second groove formed therein and a second seal disposed in the second groove; and the piston head comprising a second circumferential surface having a third groove formed therein and a third seal being disposed in the third groove;

wherein the second seal and the third seal are configured to slidingly and sealingly engage an interior surface of a housing configured to retain the piston assembly.

20. A piston and housing assembly comprising:

a housing having an interior area;

a shaft;

a piston arrangement positioned on the shaft;

the piston arrangement comprising a retract head slidably mounted on the shaft and configured for retracting the shaft, the piston arrangement comprising a piston head fixedly secured to the shaft and configured for extending the shaft, the retract head having a retract-area and the piston head having a extend-area;

the retract head and the piston head being disposed entirely in the interior area of the housing;

the retract-area having a first magnitude and the extend-area having a second magnitude, the first magnitude being greater than the second magnitude so that upon application of a fluid pressure to the retract-area the piston arrangement generates and applies a retract force to the shaft and upon release of the fluid pressure to the retract-area and application of the fluid pressure to the extend-area the piston arrangement generates and applies an extend force to the shaft, the fluid pressure having a predetermined magnitude; and the retract force is greater than the extend force;

the piston arrangement being configured to cause extension of the shaft from a retracted position to an extended position and to cause retraction of the shaft from the extended position to the retracted position; and a variable volume reservoir formed between the piston head and the retract head, the variable volume reservoir having a volume that is configured to change during some axial movement of the shaft and to remain constant during other axial movement of the shaft.

* * * * *